Jan. 1, 1963
E. WEHLIN
3,070,952
MACHINE WITH OSCILLATING CUTTING TOOL
FOR REMOVING WELDING BULGES
Filed Oct. 7, 1959
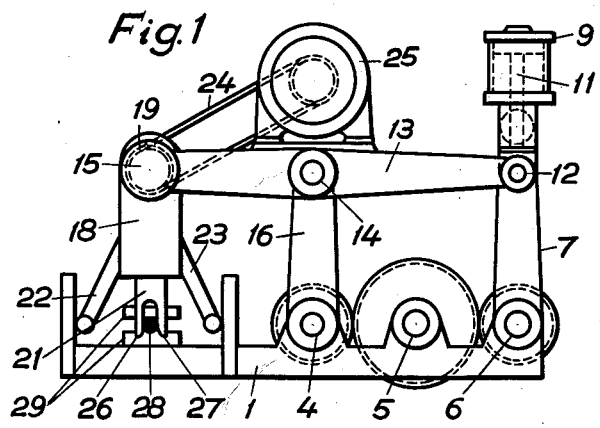
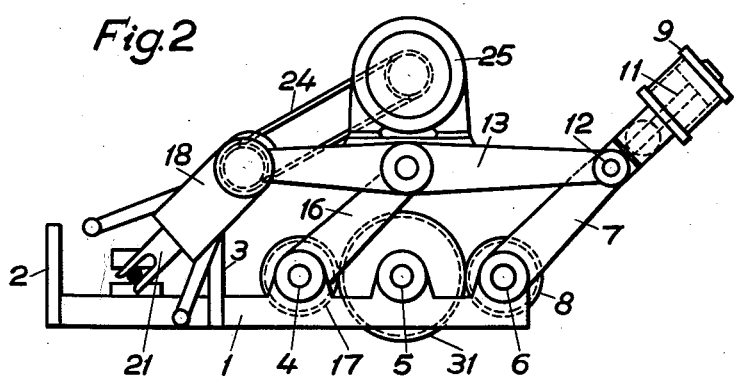
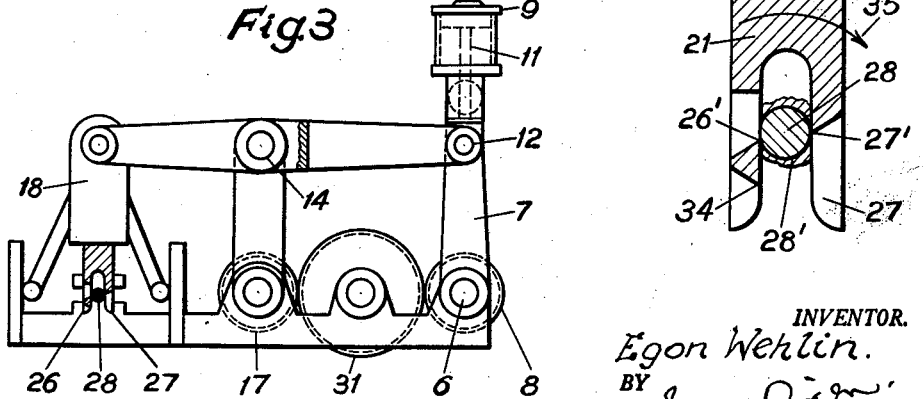
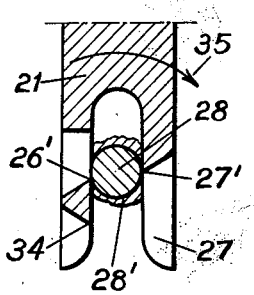
INVENTOR.
Egon Wehlin.
BY
Attorney.

United States Patent Office 3,070,952
Patented Jan. 1, 1963

3,070,952
MACHINE WITH OSCILLATING CUTTING TOOL FOR REMOVING WELDING BULGES
Egon Wehlin, Hammarby, Sweden, assignor to Allmanna Svenska Elektriska Aktiebolaget, Vasteras, Sweden, a corporation of Sweden
Filed Oct. 7, 1959, Ser. No. 5,581
1 Claim. (Cl. 59—29)

The present invention concerns an arrangement for the removal of welding bulges and is especially useful in connection with chain manufacturing machines, i.e. machines for full or semi-automatic manufacturing of welded chains.

The invention is characterised in that the machine is provided with a tool having a fork-shape and comprising two tongues, each tongue being provided with at least one cutting edge so arranged that the cutting edge on one tongue faces towards and the cutting edge on the other tongue faces away from the face ends of the tongues.

According to the invention, a means is provided to clamp a chain link with its longitudinal axis extending in a predetermined direction and to allow movement of the tool with its tongues projecting in a traverse direction to this axis of the link through 180° about this axis so that two integral chips of burr are removed during a single swinging motion of the tool.

The invention is more readily understood by reference to the accompanying drawings in which:

FIGURES 1–3 show a machine according to the invention in which the cutting tool is given a swinging motion, whereas FIGURE 4 is a detailed view of the cutting tool.

In FIGURE 1, 1 designates a base plate which carries vertical guiding bars 2 and 3 as well as bearings 4, 5 and 6. In the bearing 6, the arm 7 is pivoted, and at one end of the arm a gear wheel 8 is attached. A cylinder 9 is attached to the arm 7, in which cylinder a piston, carried by a rod 11, is movable, said rod being journalled in the journal 12 attached at the end of a lever 13. The lever 13 is further journalled in the bearing 14 and has at its opposite end a bearing 15. In the bearing 14 one end of the arm 16 is journalled, and in the opposite end of this arm there is a gear wheel 17 which is journalled in the bearing 4 at the base plate 1. In the bearing 15 a tool holder 18 is eccentrically journalled. The eccentric 15 is rotated by a sprocket wheel 19. The tool holder 18 carries the cutting tool 21 and the guiding arms 22 and 23. The sprocket wheel 19 is driven by the motor 25 by means of the chain 24. The cutting tool 21 is at the lower end provided with prongs or tongues 26—27 which are provided with cutting edges 26' and 27'. The welded link 28 of the chain is jammed between the clamping jaws 29. Cutting edge 26' faces away from and cutting edge 27' faces towards the free ends of the tongues.

The arrangement acts in the following way: The link 28 is welded in a preceding operation so that at the welding joints a bulge is formed, which may be of variable size. This link 28 is on the drawing located at the clamping jaws 29. The piston rod 11 is at the beginning of the operation in its lower position, which means that the piston rod 11, over the bearing 12, acts on the lever 13 so that the tool holder 18 with the cutting tool 21 and the guiding arms 22 and 23, is located above the welded link. The cylinder 9 is now actuated so that the piston rod 11 is moved upwardly, with the consequence that the lever 13 is actuated over the bearing 12 so that the holder 18 is moved downwards against the chain link. The guiding arms 22 and 23, sliding against the guiding bars 2 and 3, guide the cutting tool into the position indicated on the drawing, i.e. so that one limb of the link is embraced by the tongues 26, 27. The driving motor 25 drives the sprocket wheel 19 over the driving chain 24 with the consequence that the holder 18, due to the eccentric pivoting, is actuated so that the cutting tool 21 performs a reciprocating motion in relation to the link 28 of the chain to be manufactured. By means of a device not shown on the drawing the gear wheel 31 will be turned, which motion is transmitted to the arms 7 and 16 over the gear wheels 8 and 17. The ratio between the gear wheel 31 and the gear wheels 8 and 17 is suitably chosen to be 2:1, i.e. so that a motion of the gear wheel 31 through about 90° means a motion of the tooth wheels 8 and 17 through about 180°, which means that the arms 7 and 16 are also turned through 180°. As the cutting tool 21 always has a reciprocating motion in relation to the chain link, the bulge will be entirely cut away. The guiding arms 22 and 23 will at the beginning of the operation slide against the guiding bars 2 and 3, but at the turning of the links 7 and 16 the guiding action of the arms 22 and 23 in relation to the chain link will be taken over by the guiding members 26 and 27, because the reciprocating motion of the cutting tool is small and this means that the guiding members 26 and 27 will not lose contact with the chain link.

In FIGURE 4, which is shown in detail, the guiding members are designated 26 and 27, and are provided with cutting edges 26' and 27'. The chain limb is designated 28 and the welding burr is designated 28'. As can be clearly seen from this figure, the burr is removed from a part of the circumference as soon as the tool is lowered, and the rest of the burr, designated by hatching, is removed by the swinging motion of the cutting tool. The burr is removed in a single swinging motion of the tool. The swinging motion necessary for the removal of the burr is about 180°. Then the machine returns from the position shown in FIGURE 2 to that of FIGURE 1, but before the tool is moved back from the limb of the link by operating the piston 10. When the tool 21 is lowered, the burr on the limb 28 is partly removed by the cutting edges 34 and 27', and when the tool is lowered so much that the edge 27' reaches the horizontal line through the centre of the limb, the swinging motion of the tool commences in the direction indicated by the arrow 35, and the rest of the burr is removed by the edges 27' and 26', which act simultaneously in the same peripheral direction.

I claim:

Apparatus for the removal of welding burrs from welded chain links, comprising means to clamp a link with its longitudinal axis extending in a predetermined direction, a fork-shaped tool having tongues extending in a second direction transverse to said predetermined direction, means mounting said tool for movement of the tongues in said second direction to embrace a chain link limb held by said clamping means, cutting edges one on the inner side of each of said tongues extending in said predetermined direction, means for swinging the fork-shaped tool through 180° about a centre line extending in said predetermined direction and lying between two of said cutting edges located on opposite tongues, the cutting edge on one tongue facing towards and the cutting edge on the other tongue facing away from the free ends of the tongues, whereby said two edges act simultaneously in the same peripheral direction.

References Cited in the file of this patent

UNITED STATES PATENTS

| | | |
|---|---|---|
| 2,125,967 | Taylor et al. | Aug. 9, 1938 |
| 2,531,240 | Wilcox | Nov. 21, 1950 |

FOREIGN PATENTS

| | | |
|---|---|---|
| 738,998 | Great Britain | Oct. 26, 1955 |
| 1,171,732 | France | Oct. 6, 1958 |